United States Patent [19]

Takeuchi

[11] Patent Number: 4,756,070
[45] Date of Patent: Jul. 12, 1988

[54] METHOD FOR MANUFACTURING SPRING ASSEMBLIES

[75] Inventor: Kazuaki Takeuchi, Ohita, Japan

[73] Assignee: Chuohhatsujo Kogyo Co., Ltd., Ohita, Japan

[21] Appl. No.: 891,504

[22] Filed: Jul. 29, 1986

[51] Int. Cl.$^4$ .................... B21D 39/00; B23P 11/00
[52] U.S. Cl. .................... 29/515; 267/179
[58] Field of Search .............. 29/515, 173; 267/91, 267/179, 166, 167

[56] References Cited

U.S. PATENT DOCUMENTS

| | | | |
|---|---|---|---|
| 1,339,164 | 5/1920 | Clough | 29/515 UX |
| 1,621,299 | 3/1927 | White | 29/515 UX |
| 1,977,038 | 10/1934 | Brand | 29/515 X |
| 2,241,952 | 5/1941 | Lachman | 29/515 UX |
| 3,033,010 | 5/1962 | Pintarelli | 29/515 UX |
| 3,489,255 | 1/1970 | Gatewood | 267/91 X |
| 3,782,708 | 1/1974 | Dulude et al. | 267/179 X |
| 3,866,287 | 2/1975 | Dulude et al. | 267/91 X |
| 4,549,859 | 10/1985 | Andrione et al. | 267/179 X |

FOREIGN PATENT DOCUMENTS

| | | | |
|---|---|---|---|
| 552290 | 4/1923 | France | 29/515 |
| 135735 | 8/1983 | Japan | 29/515 |

*Primary Examiner*—Charlie T. Moon
*Attorney, Agent, or Firm*—Jordan and Hamburg

[57] ABSTRACT

A method for manufacturing spring assemblies, in which a spring is fixed to a hole formed in a linear or an annular metal plate by compressing side edges of the plate to collapse the hole after inserting an end of the spring therethrough. The process is simple, and the obtained spring assemblies have excellent durability because there are not any projecting parts for installing springs on the metal plate, which are otherwise a factor in fatigue failure.

10 Claims, 3 Drawing Sheets

METHOD FOR MANUFACTURING SPRING ASSEMBLIES

BACKGROUND OF THE INVENTION

The present invention relates to a method for manufacturing spring assemblies used in automotive automatic transmissions, etc. Spring assemblies in which plural springs are arranged on one side of an annular plate in spaced relation are used in automotive automatic transmissions. In conventional production, a projection part is formed on one side of an annular plate by punching, etc., and one end of a spring is fayed to the projecting part. For example, forms and producing methods are disclosed in U.S. Pat. Nos. 3,782,708, 3,866,287 and 3,891,823. However, complicated processes are required for such spring assemblies because it is difficult to install a spring vertically, and fatigue of the projecting part of the obtained spring assemblies results from use and the danger of damage arises.

SUMMARY OF THE INVENTION

The present invention solves the above-mentioned problems, and spring assemblies having easy assembly and excellent durability are obtained.

It is an object of the present invention to provide spring assemblies using a method wherein holes for inserting one end of a helical spring to an annular plate are formed without requiring any projecting part, which is a cause of damage to annular plates, one end of a spring is inserted into the holes, and a compressing treatment is performed on the side edges of the plate around the holes.

A method for manufacturing spring assemblies involves forming a number of, for example, round or square holes for inserting a spring having a projected groove in a metal plate consisting of a linear or an annular narrow width bonded structure in spaced relation to each other, wherein the diameter of the holes for inserting a spring is slightly larger than the outside diameter of an inserting end of a spring and the projected groove runs to the holes for inserting a spring and projects in the direction of an outer circumference, inserting one end of the spring into the holes, and then fixing the spring by compressing the holes from a side of the metal plate.

DETAILED DESCRIPTION OF THE PREFERRED EMBODIMENTS

Figure 1:
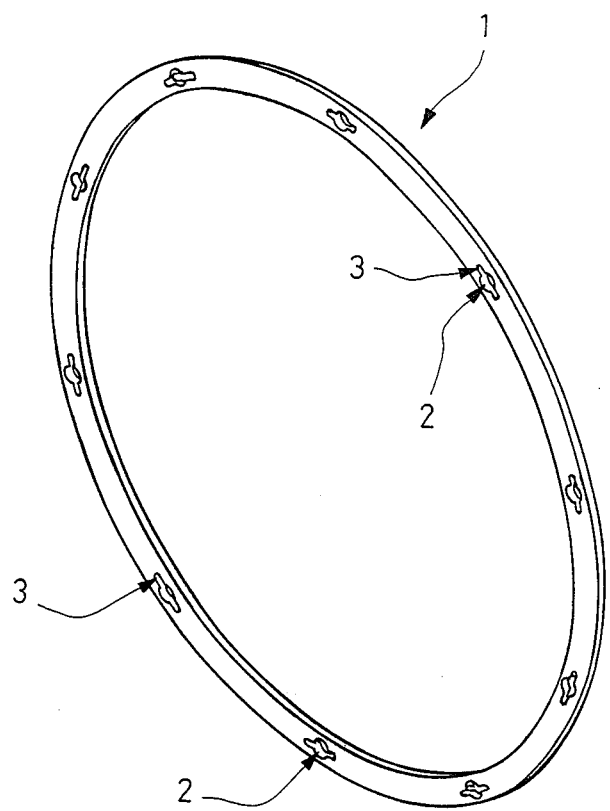
FIG. 1 is a perspective view illustrating a metal plate of the present invention.
Figure 2:
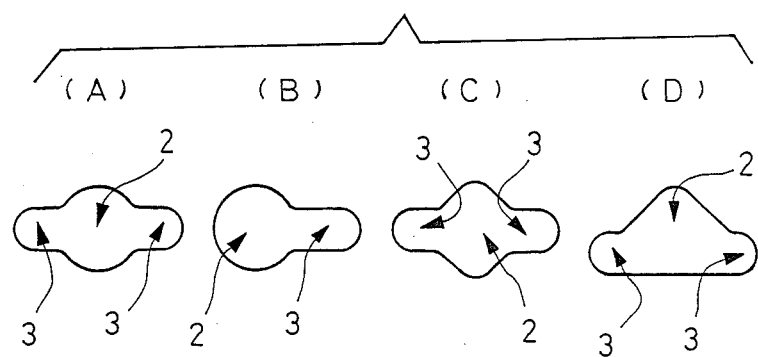
FIGS. 2(A), 2(B), 2(C) and 2(D) are detail views illustrating embodiments of the holes for inserting a spring into the metal plate.
Figure 3:
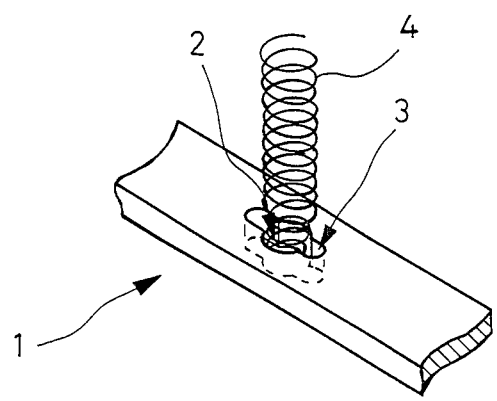
FIG. 3 is a detail view of a portion of the metal plate illustrating a spring inserted into the metal plate.
Figure 4:
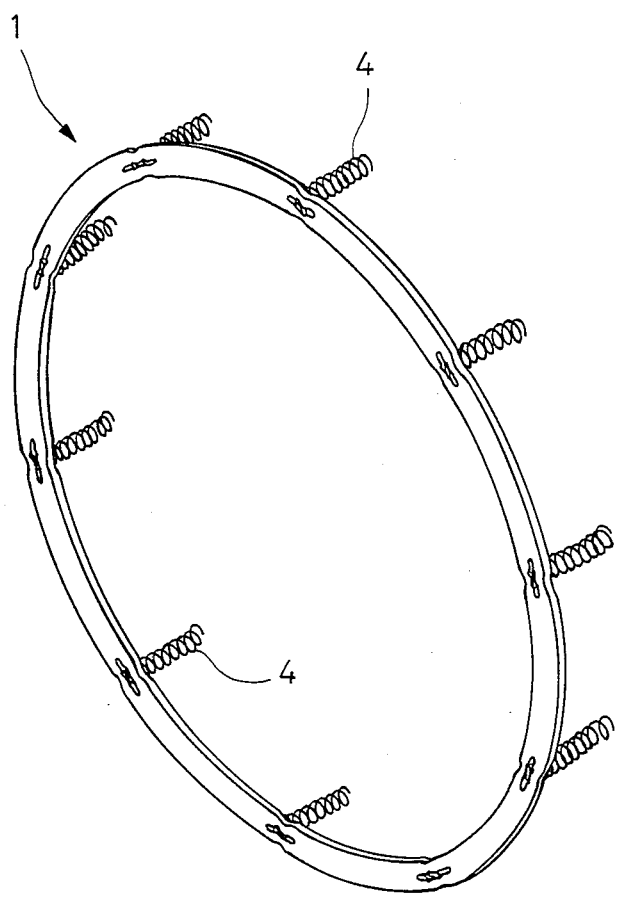
FIG. 4 is a perspective view of a manufactured spring assembly of the present invention.

Referring now in detail to the drawings, FIG. 1 shows an annular metal plate 1 which is a form of spring assembly used in automotive automatic transmissions. The form of spring assembly is made in a straight form or a curved form in accordance with required use. An annular plate, as shown in FIG. 1, is obtained by a method in which an annular plate is obtained from a plain plate by press punching or a method in which a material having a different form is wound into an annular plate, and both ends of the annular plate are welded. Holes 2, such as round, oval, square or triangular holes 2 as shown in FIGS. 2(A) to 2(D), are arranged on a metal plate 1. The size of the holes 2 for inserting a helical spring 4 has to be slightly larger than the size of an end part of spring 4 to be inserted therethrough. A projected groove 3 is integral with the holes for inserting a spring, and the projected groove 3 projects out from the outer circumference of the hole 2 for inserting a spring. The projected groove 3 projects from one side or both sides of the holes 2 for inserting a spring, as shown in FIG. 2, and is opened and formed by a press at the same time as the holes 2 for inserting a spring 2 are formed. The projected groove 3 is provided in order that tightening can be accomplished by a small degree of compressive force at the time of compressing and projects along the longitudinal direction of the metal plate 1. One side of spring 4 is inserted into the holes 2 as shown in FIG. 3, and spring 4 is fixed by compressing side edges of the plate to collapse the holes 2 from the side of metal plate 1. In this case, it is possible to use a spring 4 in which the size of an inserting end is the same as the other spring parts. It is also possible to use a spring in which the size of an inserting end is smaller than the other spring parts. When using a spring in which the size of an inserting end is smaller than the other spring parts, it is only necessary to enlarge the size of the holes 2 for inserting spring 4 enough to preserve the necessary spring force. Therefore, this embodiment is desirable when given the condition that it is hard to enlarge the width of metal plate 1. When spring 4 is inserted into the holes 2 for inserting spring 4, as shown in FIG. 3, spring 4 can be kept vertically aligned with fair accuracy if metal plate 1 is arranged on a horizontal plate, because spring 4 is inserted from above, spring 4 is fixed to metal plate 1 with sufficient vertical angle if compressing is performed from sides of metal plate 1 under the above-mentioned condition, it is not necessary to grind a pointed surface on the spring later on, and therefore, abbreviation of the process is achieved. However, a pointed surface of the spring has to be ground after the spring is fixed by compressing if further accuracy is needed.

In fixing spring 4 by compression of the holes 2 in the present invention, spring 4 is inserted and fayed in the holes 2 for inserting a spring, and then the holes 2 for inserting a spring itself are easily reduced because the projected groove 3 is compressed so as to partially close by compression from the sides of metal plate 1. Compression is achieved with only a small degree of pressure, and the inner circumference of the holes 2 for inserting a spring is fayed to a spring 4 and is tightly combined therewith because of the repulsion force of spring 4.

Next, examples of the present invention are explained.

EXAMPLE 1

Round holes for inserting a spring having a 38 mm inside diameter and a projected groove having a roundish top end, a 2.1 mm length and a 2.0 mm width and formed integrally with the round holes on both sides of the holes, are arranged at 20 points around an annular metal plate having a 167.4 mm outside diameter, which is formed by using a steel plate having a 6.6 mm width and a 2.0 mm thickness, at equal intervals by press-punching. Second, one end of a spring having a 22.5 mm total length and a 3.7 mm outside diameter, which is formed by using a wire having a 0.7 mm diameter, is fayed into the holes for inserting the spring, the core metal is devoted to an opening side in the inner circumference of the spring, and the spring is fixed to the metal plate by compression using a pressing tool from the outer circumference side.

EXAMPLE 2

A spring having an outside diameter of 3.7 mm for three turns of one end of a spring for fixing, and an outside diameter of 5 mm for the remaining turns is fixed to a metal plate, which is similar to the metal plate mentioned in Example 1 and made by the same process as in Example 1. The diameter of the wire is also 0.7 mm.

In the springs obtained in Examples 1 and 2, a wall of the projected groove which is open to the metal plate is deformed to a crushed form, the inner circumference of the holes for inserting the spring and the spring are tightly fayed, and their bond strength is great.

As mentioned above, the producing process according to the present invention is very simple. That is to say, only punching of the holes for inserting a spring through a metal plate and a compressing treatment after the spring is inserted are required in the present invention.

Also, the obtained spring assemblies are tightly combined because the repulsion force of the spring and deformation of walls of the holes for inserting the spring by compression work together. The assembly has excellent durability because there are not any members which are factors in fatigue failure from subsequent use, such as a metal plate projecting part for fixing a spring.

What is claimed is:

1. A method for manufacturing spring assemblies comprising
    forming a plurality of holes at spaced-apart intervals along a narrow-width, elongate metal plate having side edges, said metal plate being substantially flat adjacent said holes such that there are not projections adjacent said holes projecting from the surface of said metal plate;
    forming a groove on at least one side of each of said holes, said groove communicating with said hole and extending away from said hole in the elongated direction of said metal plate;
    inserting an end of a helical spring into each of said holes, each holes having a cross-dimension perpendicular to the elongate direction of the metal plate slightly larger than the diameter of the end of the spring being inserted therethrough; and
    compressing said side edges of said metal plate on opposite sides of said hole to collapse said holes and reduce the cross-dimension of each of said holes, whereby the end of the inserted spring and hole are fayed and the inserted spring end is thereby secured in said hole.

2. A method as in claim 1, wherein said metal plate is straight.

3. A method as in claim 1, wherein said metal plate is curved.

4. A method as in claim 1, wherein said holes are spacedapart at equal intervals.

5. A method as in claim 1, wherein the diameter of the spring end is smaller than the diameter of the remainder of the spring as a result of said compressing of said metal plate.

6. A method as in claim 1, wherein two grooves are formed extending away from each hole in the extended direction of said metal plate.

7. A method as in claim 1, wherein each said hole has a shape selected from the group consisting of round, oval, square and triangular.

8. A method as in claim 1, wherein said metal plate and said holes are compressed from two opposite sides of said metal plate.

9. A method as in claim 1, wherein the inserted end of each spring is secured in each hole to align the spring substantially perpendicularly with respect to the surface of the metal plate.

10. A method as in claim 1, wherein said holes and grooves are formed simultaneously.

* * * * *